F. FICHT.
Wood Box.

No. 104,132. Patented June 14, 1870.

Witnesses:
Gustave Dieterich
Geo. W. Mabee

Inventor:
Frank Ficht
per Munn & Co
Attorneys.

United States Patent Office.

FRANK FICHT, OF DYCKESVILLE, WISCONSIN.

Letters Patent No. 104,132, dated June 14, 1870.

IMPROVED WOOD-BOX.

The Schedule referred to in these Letters Patent and making part of the same.

*To all whom it may concern:*

Be it known that I, FRANK FICHT, of Dyckesville, in the county of Kewaunee and State of Wisconsin, have invented a new and useful Improvement in Wood-Box; and I do hereby declare that the following is a full, clear, and exact description thereof, which will enable others skilled in the art to make and use the same, reference being had to the accompanying drawing forming part of this specification, in which—

Similar letters of reference indicate corresponding parts.

My invention has for its object to furnish an improved box for holding fire-wood when prepared for the stove, which shall be neat in appearance, convenient in use, and easily kept cleaned out; and It consists in the box constructed as hereinafter more fully described.

A is the main box, the front of which may be so formed as to represent a bureau, and which is provided with a cover, a'.

In the lower part of the box A is formed a drawer, constructed similar to a bureau drawer, and which is lined with zinc, so that it may retain any water that may drop into it from the wood, or from the melting of snow or ice that may have adhered to the wood.

To the box A, just above the drawer B, is secured a grate, C, upon which the wood placed in the box rests, and which allows the dust and dirt adhering to said wood to drop into the drawer B, which may be easily drawn out and emptied when required.

D is an inner box, open at top and bottom, which rests upon the upper side of the grate C.

The box D is made a little smaller than the box A, so as to leave a narrow space between the sides and ends of the outer box A and the sides and ends of the inner box D, for the circulation of air to keep the outer box dry.

Figure 1:
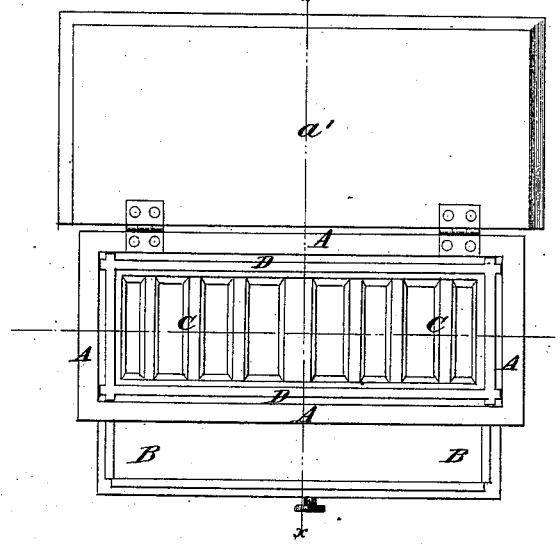
Figure 1 is a top view of my improved wood-box, the cover being raised and the drawer partly drawn out.
Figure 2:
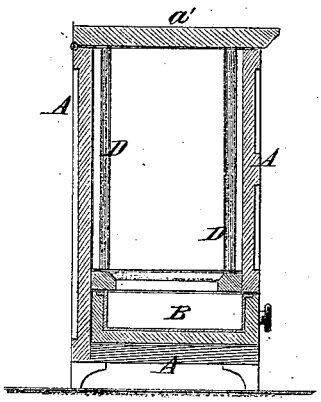
Figure 2 is a vertical cross-section of the same, taken through the line x x, fig. 1.

The side boards of the box D project a little at the ends, to rest against the ends of the box A, and to said side boards near their ends are attached narrow strips or cleats to rest against the sides of the said outer box A, as shown in fig. 1, to keep the inner box D securely in place and prevent it from moving about in the box A.

The inner box D prevents the outer box A from being injured or worn by the wood, and may be conveniently taken out when desired, and when worn may be replaced by a new one.

Having thus described my invention,

I claim as new and desire to secure by Letters Patent—

An improved wood-box, formed by the combination of the outer box A, cover a', zinc lined drawer B, grate C, and inner box D, with each other, substantially as herein shown and described, and for the purposes set forth.

FRANK FICHT.

Witnesses:
    ABNER BAKER,
    LLEWELLYN BAKER.